United States Patent [19]

Gossage

[11] 4,105,347
[45] Aug. 8, 1978

[54] GIN POLE CONNECTOR

[76] Inventor: Thomas M. Gossage, 39 Seaview, Daly City, Calif. 94015

[21] Appl. No.: 791,501

[22] Filed: Apr. 27, 1977

[51] Int. Cl.² ............................................ F16C 11/06
[52] U.S. Cl. .................... 403/157; 403/325; 403/327; 403/324
[58] Field of Search ............ 403/324, 157, 146, 149, 403/325, 328, 327, DIG. 4, 158, 161, 354, 379

[56] References Cited

U.S. PATENT DOCUMENTS

| | | | |
|---|---|---|---|
| 1,099,758 | 6/1914 | Nichols | 403/327 |
| 1,460,082 | 6/1923 | Spahr | 403/325 |
| 2,232,997 | 2/1941 | Caldwell | 403/146 |
| 2,435,225 | 2/1948 | Kolodner | 403/96 X |
| 3,847,488 | 11/1974 | Gossage | 403/79 |

FOREIGN PATENT DOCUMENTS 109,287  4/1968  Denmark ............................ 16/114 R

*Primary Examiner*—Andrew V. Kundrat
*Attorney, Agent, or Firm*—Phillips, Moore, Weissenberger, Lempio & Majestic

[57] ABSTRACT

The anchored end of a mast of a gin-pole derrick is pivotally mounted on a releasable connector. The connector comprises a pair of laterally spaced support brackets having a retaining pin reciprocally mounted thereon for movement between a first position attaching the mast on a large portion of the pin and a second position whereby the mast may be released and detached from a smaller portion of the pin. A compression coil spring is mounted between the pin and one of the support brackets to normally bias the pin to its former condition of operation, attaching the mast on the connector.

8 Claims, 4 Drawing Figures

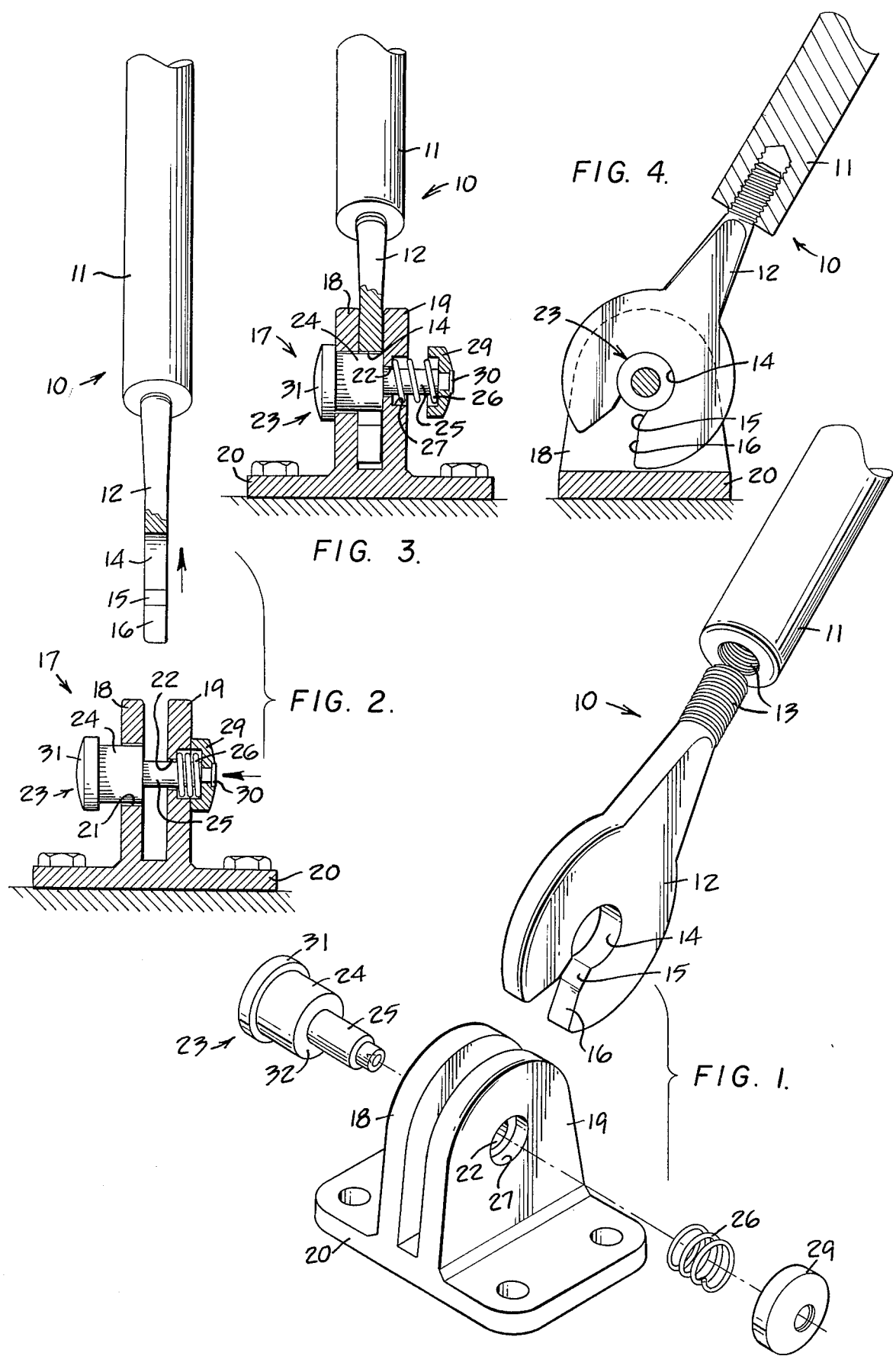

GIN POLE CONNECTOR

BACKGROUND OF THE INVENTION

A gin-pole derrick comprises a mast having guys secured to its lower end and arranged to permit the mast to lean in any desired inclination relative to ground level. A load may be raised or lowered by ropes leading through sheaves or blocks, also secured to the upper end of the mast. The lower end of the mast is normally attached to a support bracket by a removable pivot pin.

A common problem with this type of connector for a conventional gin-pole derrick is that the pin is oftentimes lost upon removal thereof for purposes of replacing the mast. One solution to such problems may be found in U.S. Pat. No. 3,847,488 wherein a threaded bolt is adapted to remain attached to a pair of support brackets upon removal of the mast therefrom. However, problems arise with the latter type of connector, such as the accumulation of dirt and the like in the exposed threads of the bolt which render it difficult to function properly over an extended period of time.

SUMMARY OF THE INVENTION

An object of this invention is to overcome the above, briefly described problems by providing an economical and non-complex releasable connector which is substantially free from malfunction due to the accumulation of dirt or the like thereon. In addition, the connector is adapted to expeditiously release an interchangeable supported member, such as the mast of a gin-pole derrick, while yet preventing the inadvertent removal of a retaining pin means therefrom.

The connector comprises a pair of upstanding and laterally spaced first and second support brackets and means defining a first bore through the first support bracket and a second bore through the second support bracket which is aligned with the first bore and has an inside diameter smaller than the inside diameter of the first bore. The retaining pin means, including a first portion and a second portion having an outside diameter less than the first portion, is reciprocally mounted in the first and second bores for movement between an attaching condition of operation disposing the first or enlarged portion of the pin means between the support brackets and a releasing condition of operation disposing the second or smaller portion of the pin means between the support brackets. The biasing means, preferably a compression coil spring, is mounted between the pin means and the second support bracket for normally urging the pin means to its attaching condition of operation preventing removal of a support member therefrom.

BRIEF DESCRIPTION OF THE DRAWINGS

Other objects of this invention will become apparent from the following description and accompanying drawings wherein:

FIG. 1 is an exploded isometric view of a releasable connector embodying this invention and partially illustrates a mast of a gin-pole derrick adapted to be attached thereon;

FIG. 2 is a longitudinal sectional view of the connector, showing it in its assembled condition of operation and with a retaining pin thereof disposed in a releasing condition of operation adapted to receive a lower end of the mast thereon;

FIG. 3 is a view similar to FIG. 2, but illustrating the pin in its attaching condition of operation with a lower end of the mast attached thereon; and FIG. 4 is a transverse sectional view through the connector and mast.

DETAILED DESCRIPTION

FIG. 1 partially illustrates a mast 10 for a gin-pole derrick comprising a support member 11 adapted to be threadably attached on a mounting or flange portion 12 by interengaging screw threads 13. Mounting portion 12 has a keyhole slot formed therethrough comprising a circular aperture 14, a slot portion 15 and a flared opening 16 coextensive with the slot. A releasable connector 17 of this invention comprises a pair of upstanding and laterally spaced first and second support brackets 18 and 19, respectively, mounted on a base plate 20, adapted to be bolted or otherwise secured in a stationary manner.

As more clearly shown in FIG. 2, a first bore 21 is formed through first bracket 18 and a second bore 22 is formed through second support bracket 19, the second bore having an inside diameter smaller than the inside diameter of the first bore. A retaining pin means 23 comprises cylindrical first and second portions 24 and 25 having outside diameters slightly less than the inside diameters of bores 21 and 22, respectively, to provide close-fitting relationships therebetween. The pin means is reciprocally mounted in the bores for movement between its FIG. 2 releasing condition of operation, wherein pin portion 25 is disposed between brackets 18 and 19, and its FIG. 3 attaching condition of operation, wherein pin portion 24 is disposed between the brackets.

In its FIG. 2 releasing condition of operation, mounting portion 12 of mast 10 is adapted to be inserted on pin 23 in that slot 15 is dimensioned to be slightly larger than the outside diameter of pin portion 25. When pin 23 is moved rightwardly to its FIG. 3 attaching condition of operation, pin portion 24 is disposed within aperture 14 of mounting portion 12 of the mast which has an inside diameter slightly greater than the outside diameter of pin portion 24. The pin is normally biased to its FIG. 3 attaching condition of operation by biasing means, preferably in the form of a compression coil spring 26.

The spring is mounted on pin portion 25 has a first end thereof disposed in a counterbore 27 formed in an outboard side of second bracket 19. The opposite end of the spring is disposed within a counterbore formed in a washer 29, secured on pin 23. The washer may be secured on the pin by upsetting an end 30 thereof or by utilizing a capscrew or other suitable fastening means.

In the FIG. 3 attaching condition of operation, a head 31 formed on an end of the pin provides stop means engaging first bracket 18 to maintain pin portion 24 in its proper position between the brackets. Another stop means in the form of an annular face 32 formed on an end of pin portion 24 abuts second bracket 19 to further aid in such positioning of the pin portion. Washer 29 provides yet another stop means for limiting leftward movement of the pin to its FIG. 2 release condition upon depression thereof.

I claim:

1. A releasable connector for releasably mounting a support member thereon comprising a pair of upstanding and laterally spaced first and second support brackets, means defining a first bore through said first support bracket, means defining a second bore through said second support bracket which is aligned with said first bore and has an inside diameter which is smaller than the inside diameter of said first bore, retaining pin means, including a cylindrical first portion closely fitted for sliding movement within said first bore and a cylindrical second portion closely fitted for sliding movement within said second bore and having an outside diameter less than the outside diameter of said first portion, reciprocally mounted in said first and second bores for movement between an attaching condition of operation disposing the first portion of said pin means between said support brackets and a releasing condition of operation disposing the second portion of said pin means between said support brackets, and biasing means disposed between said pin means and said second support bracket for normally urging said pin means to its attaching condition of operation, said pin means further comprising a head formed on a first end thereof, adjacent to the first portion of said pin, providing stop means for engaging an outer surface of said first bracket when said pin means is maintained in its attaching condition of operation, an annular face formed on an end of the first portion thereof providing stop means abutting an inner surface of said second bracket when said pin means is maintained in its attaching condition of operation and an annular washer mounted on the second portion of said pin means providing stop means for engaging an outer surface of said second bracket when said pin means is maintained in its releasing condition of operation.

2. The releasable connector of claim 1 wherein said biasing means comprises a compression coil spring mounted on said pin means.

3. The releasable connector of claim 2 wherein said spring is mounted on the second portion of said pin means.

4. The releasable connector of claim 3 wherein said spring is mounted in counterbores formed in an outboard side of said second bracket and in said washer.

5. The releasable connector of claim 1 further comprising a member pivotally mounted on said pin means and having means defining a keyhole slot through a lower end thereof, said slot comprising a circular aperture having an inside diameter slightly larger than the outside diameter of the first portion of said pin means and a coextensive slot portion having a width slightly larger than the outside diameter of the second portion of said pin means, but smaller than the outside diameter of the first portion of said pin means.

6. The releasable connector of claim 5 wherein said keyhole slot further comprises a flared opening coextensive with said slot portion adapted to aid in mounting said member on said pin means.

7. The releasable connector of claim 5 wherein said member constitutes a gin-pole mast.

8. A releasable connector for releasably mounting a support member thereon comprising a pair of upstanding and laterally spaced first and second support brackets, means defining a first bore through said first support bracket, means defining a second bore through said second support bracket which is aligned with said first bore and has an inside diameter which is smaller than the inside diameter of said first bore, retaining pin means, including a first portion and a second portion having an outside diameter less than the outside diameter of said first portion, reciprocally mounted in said first and second bores for movement between an attaching condition of operation disposing the first portion of said pin means between said support brackets and a releasing condition of operation disposing the second portion of said pin means between said support brackets, biasing means comprising a compression coil spring mounted on the second portion of said pin and disposed between said pin means and said second support bracket for normally urging said pin means to its attaching condition of operation, and an annular washer mounted on the second portion of said pin means and wherein said spring is mounted in counterbores formed in an outboard side of said second bracket and in said washer.

* * * * *